(12) United States Patent
Luo et al.

(10) Patent No.: US 11,721,074 B2
(45) Date of Patent: Aug. 8, 2023

(54) DISPLAY CONTROL METHOD AND DEVICE

(71) Applicant: Lenovo (Beijing) Limited, Beijing (CN)

(72) Inventors: Yingling Luo, Beijing (CN); Bin Cui, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/474,713

(22) Filed: Sep. 14, 2021

(65) Prior Publication Data
US 2022/0207835 A1   Jun. 30, 2022

(30) Foreign Application Priority Data

Dec. 25, 2020   (CN) .......................... 202011565110.4

(51) Int. Cl.
*G06T 19/00* (2011.01)
*G06F 3/04815* (2022.01)
*H04N 13/279* (2018.01)

(52) U.S. Cl.
CPC ........ *G06T 19/006* (2013.01); *G06F 3/04815* (2013.01); *H04N 13/279* (2018.05)

(58) Field of Classification Search
None
See application file for complete search history.

(56) References Cited

U.S. PATENT DOCUMENTS

| 2014/0375683 | A1* | 12/2014 | Salter | G06F 3/167 |
| | | | | 345/633 |
| 2015/0049018 | A1* | 2/2015 | Gomez | G09G 3/001 |
| | | | | 345/156 |
| 2018/0174366 | A1* | 6/2018 | Nishibe | G06F 3/013 |
| 2019/0340821 | A1* | 11/2019 | Chen | G06F 3/04815 |
| 2021/0295602 | A1* | 9/2021 | Scapel | G06T 7/70 |
| 2022/0058888 | A1* | 2/2022 | Fu | G06T 19/20 |

FOREIGN PATENT DOCUMENTS

| CN | 105378625 A | 3/2016 |
| CN | 107615228 A | 1/2018 |
| CN | 111860252 A | 10/2020 |

* cited by examiner

*Primary Examiner* — Yingchun He
(74) *Attorney, Agent, or Firm* — Anova Law Group, PLLC

(57) ABSTRACT

A display control method includes performing plane detection on a physical environment within a front field of view (FOV) of an augmented reality (AR) device, determining a first object in the physical environment, determining a display position of a second object based at least on the first object and a current FOV of the AR device, and displaying the second object at the display position. The display position includes a display height and a display distance.

14 Claims, 5 Drawing Sheets

DISPLAY CONTROL METHOD AND DEVICE

CROSS-REFERENCE TO RELATED APPLICATION

The present application claims priority to Chinese Patent Application No. 202011565110.4, filed Dec. 25, 2020, the entire content of which is incorporated herein by reference.

TECHNICAL FIELD

The present disclosure relates to the field of electronic technology and, in particular, to a display control method and device.

BACKGROUND

With continuous development of AR (augmented reality) technology, a combination of virtual objects and real objects displayed by AR devices has become more and more widely used. For example, virtual home furniture are placed in an actual house environment through virtual reality technology such that a decoration effect can be "previewed."

Currently, there are a plurality of ways to control the virtual objects, but control effect cannot meet various needs of users, which cannot achieve a desired control effect.

SUMMARY

In accordance with the disclosure, there is provided a display control method including performing plane detection on a physical environment within a front field of view (FOV) of an augmented reality (AR) device, determining a first object in the physical environment, determining a display position of a second object based at least on the first object and a current FOV of the AR device, and displaying the second object at the display position. The display position includes a display height and a display distance.

Also in accordance with the disclosure, there is provided a display control device including a memory storing a computer program, and a processor configured to execute the computer program to perform plane detection on a physical environment within a front field of view (FOV) of an augmented reality (AR) device, determine a first object in the physical environment, determine a display position of a second object based at least on the first object and a current FOV of the AR device, and display the second object at the display position. The display position includes a display height and a display distance.

DETAILED DESCRIPTION OF THE EMBODIMENTS

To make it more clearly, descriptions and abbreviations of technical terms used herein are summarized as follows.

AR: augmented reality, a technology that ingeniously integrates virtual information with a real world, which uses a variety of technical methods, for example, multimedia, three-dimensional modeling, real-time tracking and registration, intelligent interaction, and sensing, to simulate and apply computer-generated texts, images, three-dimensional models, music, video, and other virtual information to the real world. The two kinds of information complement each other, thus realizing "augmentation" of the real world.

FOV: field of view, an angle formed by two edges of a maximum range where an object image of a measured target can pass through a lens of an optical instrument with the lens as a vertex.

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

The embodiments of the present disclosure can be applied to an electronic device with an AR function. A product form of the electronic device may be, but is not limited to, a smart phone, a tablet computer, a wearable device, a personal computer (PC), a netbook, etc., which can be selected according to application requirements and not limited here.

Figure 1:
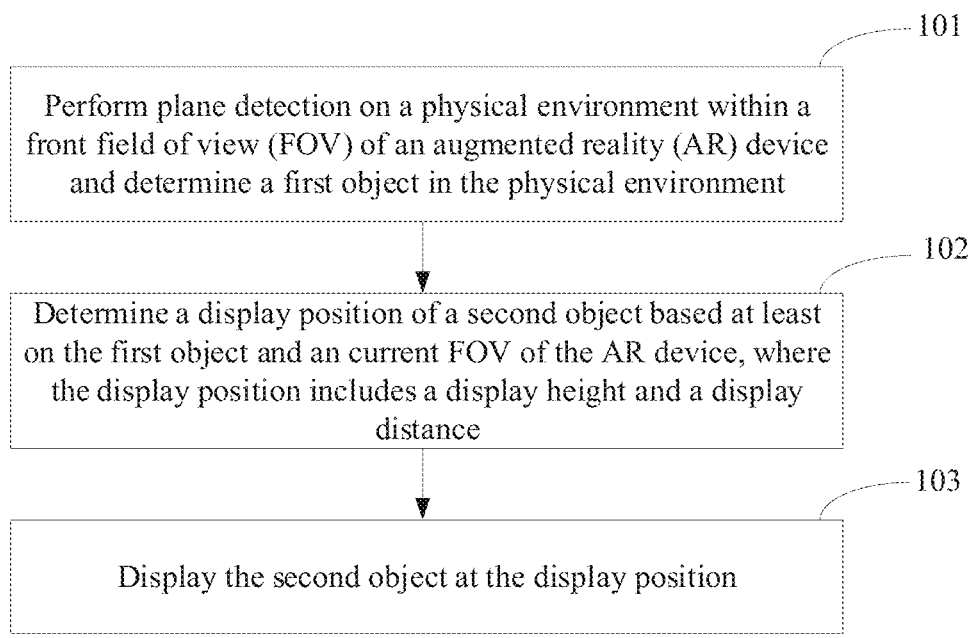
FIG. 1 is a schematic flow chart of a display control method consistent with the embodiments of the disclosure.

FIG. 1 is a schematic flow chart of a display control method consistent with the embodiments of the disclosure. As shown in FIG. 1, the display control method includes the following processes.

At 101, plane detection is performed on a physical environment within a front FOV of an AR device, and a first object in the physical environment is determined.

The AR device has a plane detection function. Based on the plane detection function, the AR device can scan to obtain the physical environment within the FOV of the AR device, determine environmental objects in the physical environment, and then perform subsequent processing related to augmented reality based on the detected environmental objects. The plane detection does not refer to a detection of the physical environment on a plane, but a detection of a three-dimensional space environment within a detection range. For example, the AR device can detect environmental objects at a distance of 1 m from the AR device, and can also detect environmental objects at a distance of 3 m from the AR device.

In the embodiments of the present disclosure, the first object in the physical environment may include a certain type of object with same characteristics. For example, the first object is a horizontal surface or a vertical plane on which physical objects can be placed, which corresponds to a table plane, a floor, or a wall, etc., in an actual environment, and can be placed or hung a virtual item on the surface or the plane later. The first object can also be a clothing display stand, that is, a model in a clothing store, which can be subsequently dressed virtual clothes. A specific form and characteristics of the first object can be determined according to actual application scenarios, which are not limited here.

The environmental objects detected by the AR device through plane detection include the first object.

At 102, a display position of a second object is determined based on the first object and a current FOV of the AR device, where the display position includes a display height and a display distance.

After the first object in the physical environment is determined through the plane detection, display of the second object can be controlled, where the second object is a virtual object. After the second object is displayed, it is convenient for a user to subsequently control the second object to enable the second object to be applied to the physical environment and combined with the first object to realize AR technology.

In an example embodiment, before the display of the second object is controlled, the display position of the second object needs to be determined first. The display position of the second object cannot be arbitrarily set but needs to be set comprehensively considering user needs and subjective using experience. For example, the user needs to perform related operations on the second object later, therefore, a display range of the second object needs be within a range that is convenient for the user to operate, e.g., within a reaching range of an arm of the user. In this scenario, it needs to be considered whether there is an occlusion relationship between the second object and the first object in the real environment. Therefore, the display position may include the display height and the display distance.

The display position of the second object can be comprehensively determined based on the first object and the current FOV of the AR device, to ensure that the display position of the second object is within the FOV of the AR device to facilitate the user to read and recognize, and to meet requirements of the display height and the display distance. The specific implementation of determining the display position of the second object will be described in detail in the following embodiments and will not be described here.

At 103, the second object is displayed at the display position.

After the display position of the second object is determined, the second object is directly controlled to be displayed at the display position to meet the implementation needs of subsequent related functions.

In the display control method of the embodiments of the present disclosure, the virtual object is not set at a fixed position, but at the display position comprehensively determined according to the current physical environment and the FOV of the AR device. The virtual object is then controlled to be displayed at a position that is convenient for an operation of the user and does not affect observation of the user of another object, thereby facilitating the operation of the user and improving experience of the user.

Figure 2:
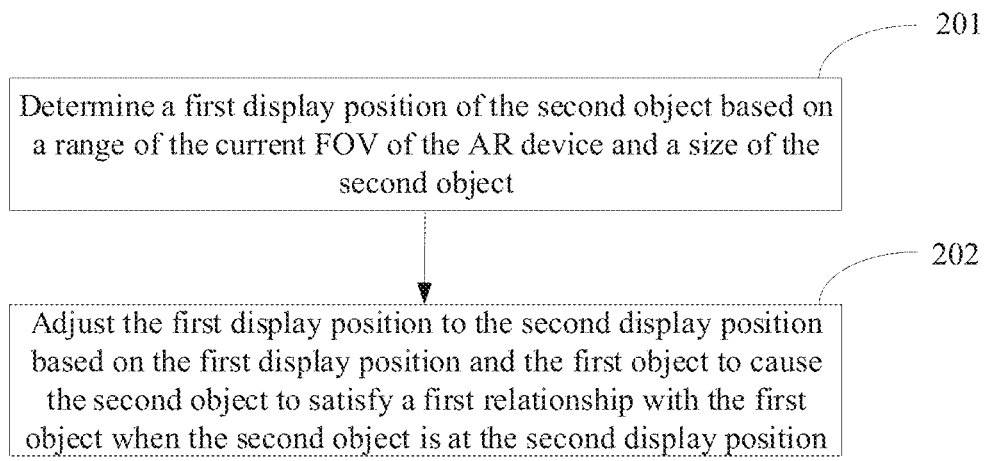
FIG. 2 is a schematic flow chart of determining a display position of a second object consistent with the embodiments of the disclosure.

FIG. 2 is a schematic flow chart of determining a display position of a second object consistent with the embodiments of the disclosure. As shown in FIG. 2, in an example embodiment, determining the display position of the second object based on the first object and the FOV of the AR device includes the following processes.

At 201, a first display position of the second object is determined based on a range of the current FOV of the AR device and a size of the second object.

Although the second object is a virtual object, the second object also has a default configuration size. Similar as a physical object, for the second object with a fixed size, when the second object is relatively close to eyes of the user, the second object seen by the user is relatively large. When the second object is relatively far from the eyes of the user, the second object seen by the user is relatively small. Therefore, in an example embodiment, a distance from the eyes of the user to the second object is determined based on the size of the second object to enable the second object to be seen by the user in a comfortable distance after the second object is displayed.

The user needs to perform the operation on the displayed second object subsequently, therefore the display position of the second object needs to be within the range of the current FOV of the AR device.

At 202, the first display position is adjusted to a second display position based on the first display position and the first object to cause the second object to satisfy a first relationship with the first object when the second object is at the second display position.

The first display position and the second display position may be same or different.

Because the first object and the second object are both three-dimensional objects and have three-dimensional spatial positions, for the eyes of the user, the first object and the second object that exist at a same time and at fixed positions may block each other. For example, the first object is a table plane, and the second object is a virtual vase. A display position of the virtual vase has an overlapping range with a spatial position of the table plane, causing the user to only see an upper part but not a lower part of the virtual vase after the virtual vase is displayed. In fact, it is not that the lower part of the virtual vase is not displayed, but the display spatial position of the virtual vase intersects the spatial position of the table plane, causing the lower part of the virtual vase to be blocked by the table plane and hence not to be seen by the user wearing the AR device.

Therefore, the size of the second object also has a function, that is, to determine whether the second object has an occlusion relationship with the first object after the second object is displayed at the first display position normally. In the embodiments of the present disclosure, it needs to ensure that the second object satisfies the first relationship with the first object after the second object is displayed at the first display position. Therefore, the first display position and the second display position may be the same or different. The first display position and the second display position being the same means that, if the second object is displayed at the first position, the second object has no occlusion relationship with the first object within the FOV of the AR device, and hence there is no need to adjust the display position of the second object and the first display position or the second display position is the display position for eventually displaying the second object. The first display position and the second display position being different means that, after the second object is displayed at the first position, the second object has an occlusion relationship with the first object within the FOV of the AR device, and hence the display position of the second object needs to be further adjusted to cause the second object to satisfy the first relationship with the first object when the second object is at the second display position and the second display position is the display position for eventually displaying the second object. The specific content of the first relationship can be set according to the requirements of the application scenario, which is not limited here.

The first relationship may include that there is no occlusion relationship between the first object and the second object, then adjusting the first display position to the second display position based on the first display position and the first object includes determining whether there is an occlusion relationship between the second object and the first object when the second object is at the first display position, where the occlusion relationship includes that one of the first object and the second object occludes the other or an occlusion area between the first object and the second object is greater than a first threshold, if so, adjusting the display position of the second object from the first display position to the second display position such that there is no occlusion between the first object and the second object at the second display position after the adjustment.

The occlusion area being greater than the first threshold may refer to that the occlusion area reaches a percentage of an entire area of an occluded object.

In some embodiments, determining the display position of the second object based on the first object and the current FOV of the AR device includes determining the display position of the second object based on the first object and a position and a posture of the user of the AR device to cause a distance between the display position and a boundary of the current FOV of the AR device to be greater than or equal to a first distance, and cause a distance between the display position and the AR device to be less than or equal to a second distance.

Because the user wears the AR device, the FOV of the AR device can also be determined according to the position and the posture of the user. The position and the posture of the user have a same function as the FOV of the AR device, which are used to determine a display range of the second object. The display range corresponds to the FOV of the AR device.

In addition, the distance between the display position of the second object and the boundary of the current FOV of the AR device is greater than or equal to the first distance to prevent the display position of the second object from being cling to the boundary of the FOV of the AR device. Therefore, the user feels that the relationship between the display position of the second object and the range of the FOV of the entire AR device is relatively harmonious and comfortable from a perspective of a visual sense. Simultaneously, the distance between the display position of the second object and the AR device is less than or equal to the second distance to ensure that the user can easily perform a manual operation on the second object within a reaching range of the arm of the user, for example, taking the second object.

Figure 3:
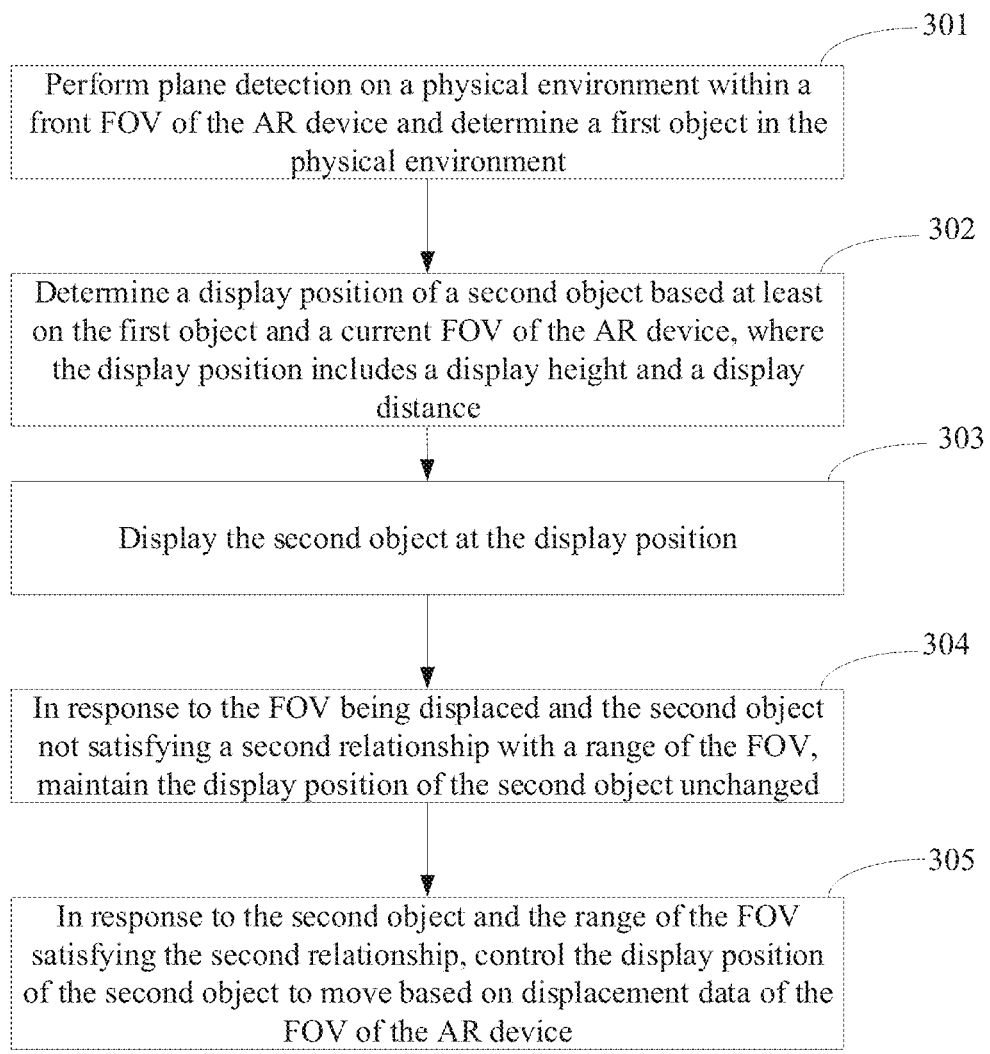
FIG. 3 is a schematic flow chart of another display control method consistent with the embodiments of the disclosure.

FIG. 3 is a schematic flow chart of another display control method consistent with the embodiments of the disclosure. As shown in FIG. 3, the display control method includes the following processes.

At 301, plane detection is performed on a physical environment within a front FOV of the AR device, and a first object in the physical environment is determined.

At 302, a display position of a second object is determined based on the first object and a current FOV of the AR device, where the display position includes a display height and a display distance.

At 303, the second object is displayed at the display position.

At 304, in response to the FOV being displaced and the second object not satisfying a second relationship with a range of the FOV, the display position of the second object is maintained unchanged.

In an example embodiment, after the display position of the second object is determined, the second object is directly fixed at the display position. When the FOV of the AR device moves with a body or a head of the user slightly, the user is considered not to want to change a visual range, thus the display position of the second object is maintained unchanged. When the body or the head of the user moves or turns to a large extent, the user is considered to want to view an object in another direction or outside the current FOV. In this scenario, the display position of the second object can be controlled to move with the FOV of the AR device to facilitate the user to operate the second object at any time.

Therefore, a determination condition needs to be set. It is determined whether to control the display position of the second object to follow the moving of the FOV of the AR device based on the determination condition. In an example embodiment, when the FOV of the AR device is displaced, a positional relationship between the second object and the range of the FOV is used as the determination condition. When the range of the FOV of the AR device and the second object do not satisfy the second relationship, the display position of the second object is maintained unchanged. The second relationship may be, but is not limited to, that more than a half of the volume of the second object is outside the range of the FOV of the AR device.

At 305, in response to the range of the FOV of the AR device and the second object satisfying the second relationship, the display position of the second object is controlled to move based on displacement data of the FOV of the AR device.

In some embodiments, the second object is entirely located within the range of the FOV of the AR device initially. As the range of the FOV of the AR device moves, the fixedly displayed second object slowly moves out of the boundary of the range of the FOV of the AR device from one side. When more than a half of the volume of the second object is outside the range of the FOV of the AR device, it is considered that the user of the AR device needs to change a current scene, and the second object is then controlled to move with the movement of the range of the FOV of the AR device.

Figure 4:
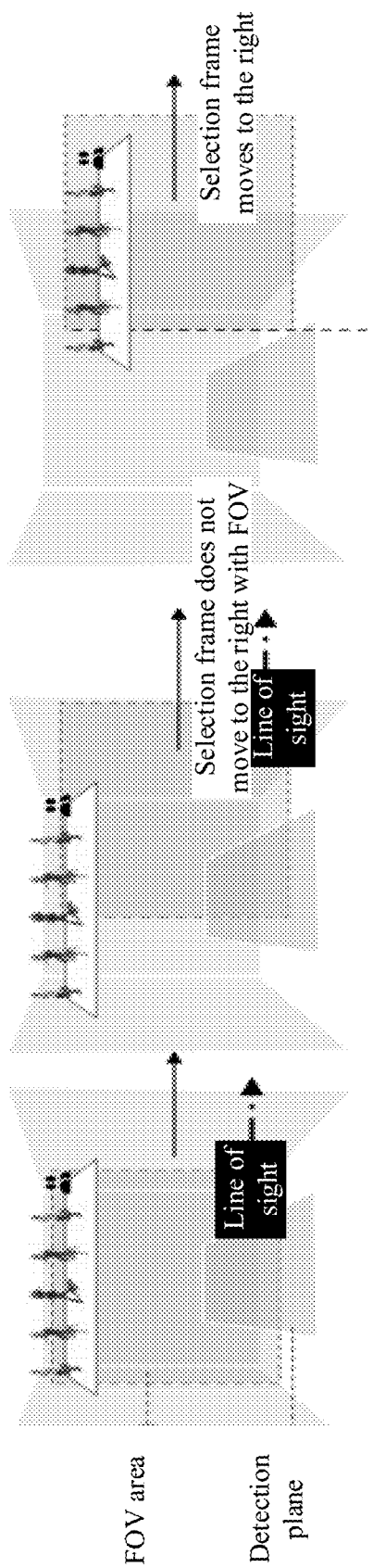
FIG. 4 is a schematic diagram showing a process in which the second object moves following a field of view range consistent with the embodiments of the disclosure.

FIG. 4 is a schematic diagram showing a process in which the second object moves following a field of view range consistent with the embodiments of the disclosure, where a dashed frame area is the range of the FOV of the AR device, an operation bar with 5 puppets is the second object, and a rest part is the first object detected by plane detection. As shown in FIG. 4, an image on a left is an initial display position of the second object. The range of the FOV of the AR device starts to move to a right as shown in a middle image in FIG. 4. Because a volume of the operation bar outside the range of the FOV of the AR device does not reach 50% of a predetermined value, the second object is maintained unmoved. The range of the FOV of the AR device continues to move to the right. When the volume of the operation bar outside the range of the FOV of the AR device reaches or exceeds 50% of the predetermined value, the operation bar moves to the right following the FOV of the AR device.

There are many manners to implement control of the second object to move following the FOV of the AR device, for example, controlling the second object to move synchronously based on the displacement data of the FOV to cause a relative position between the second object and the range of the FOV of the AR device to be maintained the same as that before the range of the FOV of the AR device moves, or setting at a certain following movement ratio, or determining the display position of the second object in real time based on a latest detected first object and the current FOV of the AR device.

In an example embodiment, after the display position of the second object is controlled to move based on the displacement data of the FOV of the AR device, the display control method may further include in response to a distance between the second object and a boundary of a detection range of the plane detection being less than a third distance and the FOV continuing to move in a displacement direction, the operation of controlling the display position of the second object to move based on the displacement data of the field angle is stopped.

In some embodiments, the detection range of the plane detection of the AR device is determined, and the first object that can be detected is also determined. In this scenario, even if the user wearing the AR device turns his head to another direction, he cannot see the first object outside the detection range. Therefore, in this scenario, the display range of the second object can be limited to the boundary of the detection range by default. When the distance between the second object and the boundary of the detection range of the plane detection is smaller than the third distance, and the FOV continues to move in the displacement direction, the operation of controlling the movement of the second object is stopped. That is, within an area of the boundary of the detection range, the second object can be moved with the movement of the FOV. When the second object is about to be moved out of or close to the boundary of the detection range, the movement of the second object reaches a limit of the movement. In this scenario, regardless of whether the FOV continues to move, the second object does not move with the movement of the FOV. The third distance can be, but is not limited to, 5 cm.

Figure 5:
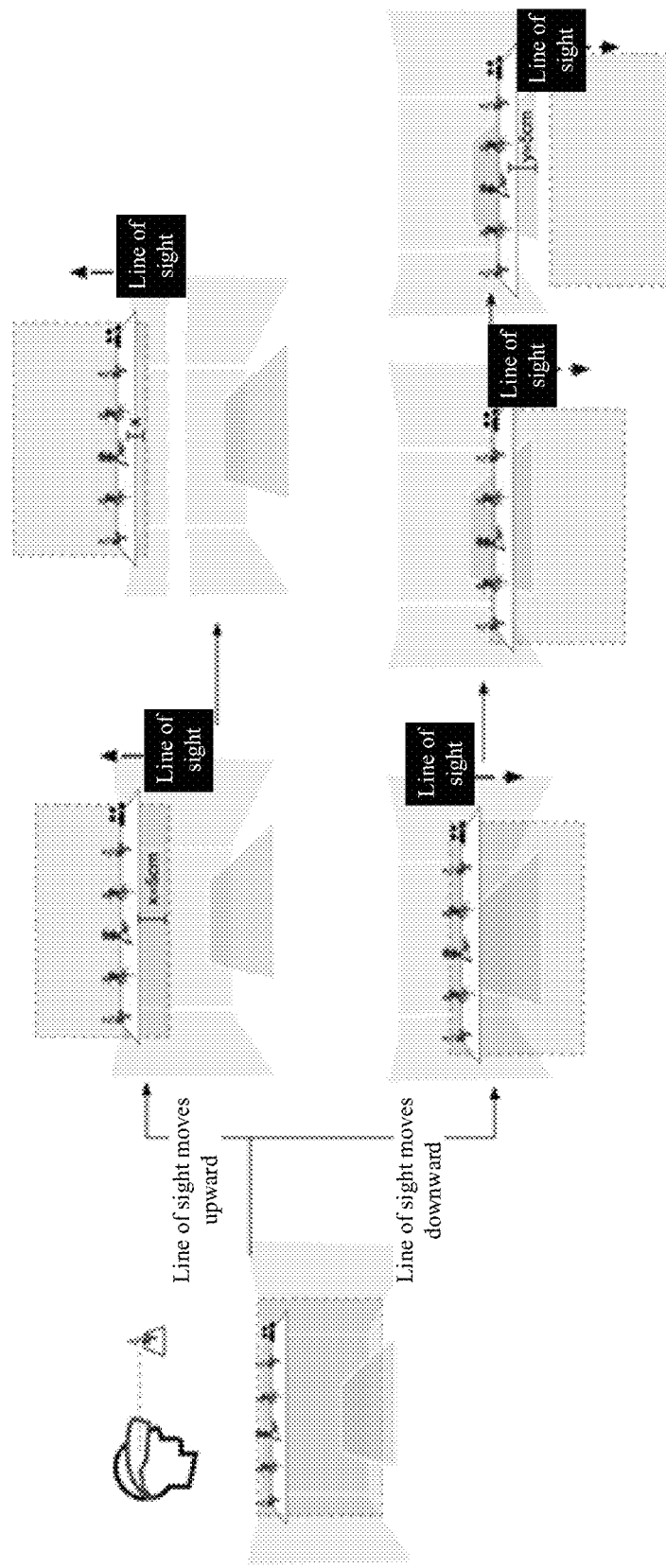
FIG. 5 is a schematic diagram showing another process in which the second object moves following the field of view range consistent with the embodiments of the disclosure.

FIG. 5 is a schematic diagram showing another process in which the second object moves following the field of view range consistent with the embodiments of the disclosure. As shown in FIG. 5, at an initial position, a line of sight of a user is flush with puppets on an operation bar, and a display position of the operation bar is shown in a left image in FIG. 5. The line of sight of the user then moves. When a distance between a bottom of the operation bar and a lower edge of the FOV is greater than or equal to X, the operation bar does not move. When the distance between the bottom of the operation bar and the lower edge of the FOV is less than X, the operation bar moves with the line of sight of the user. When the line of sight of the user moves down and the bottom of the operation bar is below an upper edge of the FOV, the operation bar does not move. When the line of sight of the user moves down and the bottom of the operation bar is flush with the upper edge of the FOV, the operation bar moves with the line of sight of the user. When the distance between the bottom of the operation bar and a lower boundary of the plane detection is less than Y, the operation bar does not move with the line of sight of the user.

In some embodiments, the second object may include a plurality of third objects. For example, as shown in FIG. 4, the operation bar is the second object including a plurality of puppets, that is, the third objects. In some embodiments, the display control method may further include obtaining a first operation, where the first operation is an operation of placing a movement target and the movement target is any one of the plurality of third objects, and controlling to place the movement target at a first position based on the first operation, where the first position is located above and in contact with the first object.

For example, in an application scenario, for a room, it needs to use AR technology to arrange some home furnishings in the room to enable the user to view virtual decoration and layout effect. The first objects in the room detected by the plane detection include a ground, a tabletop, and a wall. The virtual second objects displayed include a vase, a potted plant, and a picture. The user can control to hang the virtual picture on the wall or place the virtual vase on the tabletop manually according to his wish.

To implement the placement of a third object, the third object needs to be virtually picked up first. In some embodiments, the plurality of third objects have a fixed relative positional relationship. As shown in FIG. 4, the five puppets have a relative positional relationship. When the operation bar moves, the five puppets move synchronously with the operation bar in a locked state. Therefore, before controlling to place the movement target at the first position, the display control method may further include obtaining a second operation, where the second operation is an operation of grabbing the movement target, and controlling the movement target to release the relative positional relationship with another third object. To realize the virtual grabbing of the movement target by the user, the relative position relationship between the movement target and other third objects must be released, to enable the display position of another third object to be maintained unchanged after the user virtually picks up the movement target, and enable the user to move the movement target to any position.

In some embodiments, the display control method may further include locking the display position of the second object when the second operation is obtained. After the display position of the second object is determined, if the user does not start to operate the second object, the display position of the second object is determined in real time according to the first object and the current FOV of the AR device. That is, if the head of the user moves, the display position of the second object also moves. Only after the user starts to operate the second object, for example, the five puppets on the operation bar in FIG. 4, if the user starts to virtually pick up any of the third objects, it is considered that the user starts to operate the second object, and the second object needs to be locked to simulate a habit of the user for taking a thing from a fixed position in the real world.

For simple description, the above embodiments are all expressed as a combination of a series of actions, but those skilled in the art should know that the present disclosure is not limited by the described sequence of actions. For example, some processes in the above embodiments can be performed in another order or at a same time. Further, those skilled in the art should also know that the actions and members in the embodiments described herein are not necessarily required by the present disclosure.

The method consistent with the above embodiments of the present disclosure is described in detail, which can be implemented by various forms of devices. Therefore, a device consistent with the present disclosure is also disclosed. Specific embodiments are given below for detailed description.

Figure 6:
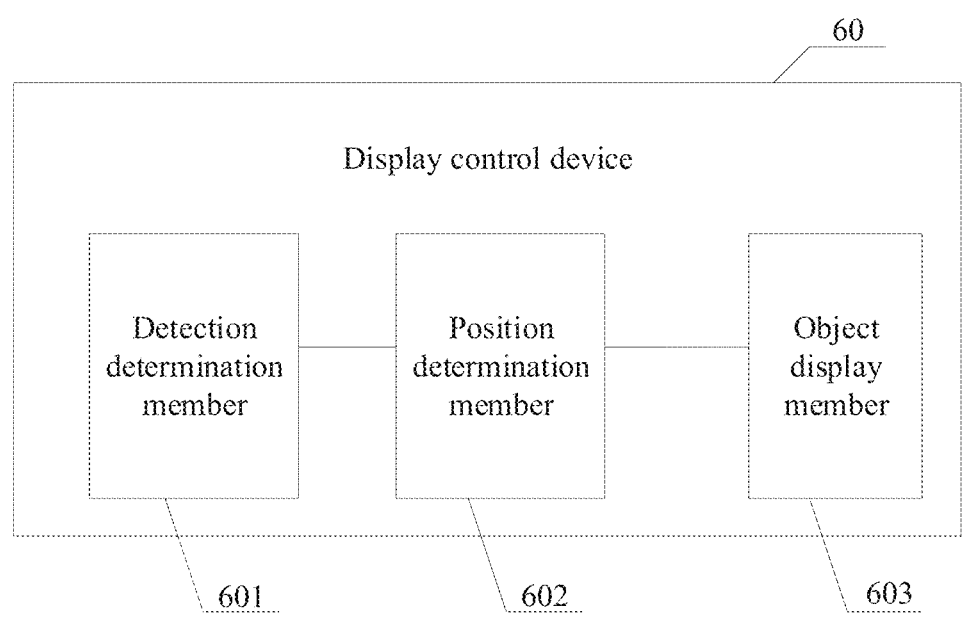
FIG. 6 is a schematic structural diagram of a display control device consistent with the embodiments of the disclosure.

FIG. 6 is a schematic structural diagram of a display control device 60 consistent with the embodiments of the disclosure. The display control device is applied to an AR device. As shown in FIG. 6, the display control device 60 may include a detection determination member 601, a position determination member 602, and an object display member 603.

The detection determination member 601 is configured to perform plane detection on a physical environment within a front FOV of an AR device, and determine a first object in the physical environment.

The position determination member 602 is configured to determine a display position of a second object based on the first object and a current FOV of the AR device, where the display position includes a display height and a display distance.

The object display member 603 is configured to display the second object at the display position.

In the display control method of the present disclosure, a virtual object to be displayed is not set at a fixed position. The display position of the virtual object is comprehensively determined according to the current physical environment and the FOV of the AR device. The virtual object is controlled to be displayed at a position that is convenient for the user to operate and does not affect the observation of other objects by the user, thereby facilitating the operation of the user and improving the experience of the user.

In some embodiments, the position determination member may include an initial position determination member configured to determine a first display position of the second object based on a range of the current FOV of the AR device and a size of the second object, and a position adjustment member configured to adjust the first display position to a second display position based on the first display position and the first object to cause the second object to satisfy a first relationship with the first object when the second object is at the second display position. The first display position and the second display position may be same or different.

In some embodiments, the first relationship may include that there is no occlusion relationship between the first object and the second object, then the position determination member 602 is specifically configured to determine whether there is an occlusion relationship between the second object and the first object when the second object is at the first display position, where the occlusion relationship includes that one of the first object and the second object occludes the other or an occlusion area between the first object and the second object is greater than a first threshold, if so, adjust the display position of the second object from the first display position to the second display position such that there is no occlusion between the first object and the second object at the second display position after the adjustment.

In some embodiments, the position determination member 602 may be specifically configured to determine the display position of the second object based on the first object and a position and a posture of a user of the AR device to cause a distance between the display position and a boundary of the current FOV of the AR device to be greater than or equal to a first distance, and cause a distance between the display position and the AR device to be less than or equal to a second distance.

In some embodiments, the display control device may further include a FOV following member configured to when the FOV is displaced, maintain the display position of the second object unchanged in response to the range of the FOV of the AR device and the second object not satisfying a second relationship, and control the display position of the second object to move based on displacement data of the FOV of the AR device in response to the range of the FOV of the AR device and the second object satisfying the second relationship.

Further, the FOV following member may also be configured to stop the operation of controlling the movement of the display position of the second object based on the displacement data of the FOV in response to a distance between the second object and a boundary of a detection range of the plane detection being less than a third distance and the FOV continuing to move in a displacement direction.

In some embodiments, the second object includes a plurality of third objects. The display control device may further include an operation obtaining member configured to obtain a first operation. The first operation is an operation of placing a movement target. The movement target is any one of the plurality of third objects. The display control device may further include an object placement member configured to control the movement target to be placed at a first position based on the first operation. The first position is located at a position above and in contact with the first object.

In some embodiments, the operation obtaining member is further configured to obtain a second operation. The second operation is an operation of grabbing the movement target. The display control device may further include a position unlocking member configured to control the movement target to release a relative positional relationship with another third object.

In some embodiments, the display control device may further include an object locking member configured to lock the display position of the second object when the second operation is obtained.

For the specific implementation, possible expansion modes, and technical effects that can be achieved by each implementation of the above display control device and members thereof, reference may be made to the description of the display control method, which are omitted here.

The display control device consistent with the embodiments includes a memory storing a computer program and a processor. The detection determination member, the position determination member, and the object display member consistent with the embodiments are all stored in the memory as program modules. The processor is configured to execute the computer program and program modules stored in the memory to realize corresponding functions.

The processor includes a kernel. The kernel is configured to execute corresponding program module from the memory. One or more kernels can be set. The processing of return visit data can be realized by adjusting kernel parameters.

The memory may be a non-transitory computer-readable media, including, for example, a non-permanent memory, a random-access memory (RAM), or a non-volatile memory, such as a read-only memory (ROM) or a flash memory. The memory includes at least one memory chip.

A storage medium storing a computer program consistent with the embodiments of the present disclosure is provided. When the program is executed by a processor, the display control method described in the above embodiments is implemented.

A processor consistent with the embodiments of the present disclosure configured to execute a program is provided. The display control method described in the above embodiments is implemented when the program is executed.

Further, an electronic device including a processor and a memory consistent with the embodiments is provided. The memory stores executable instructions of the processor. The processor is configured to execute the display control method described in the above embodiments by executing the executable instructions.

The various embodiments of the present disclosure are described in a progressive manner. Each embodiment focuses on the differences from other embodiments, and the same or similar parts between the various embodiments can be referred to each other. For the device consistent with the embodiments, because the device corresponds to the method consistent with the embodiments, the description is relatively simple, and reference can be made to the description of the method embodiments.

The relational terms, such as "first" and "second" are only used to distinguish one entity or operation from another entity or operation, which may not indicate or imply any such actual relationship or order between the entities or operations. The terms "include," "contain," and any other variants are intended to cover non-exclusive inclusion, which cause a process, method, article, or device including a series of elements not only includes the listed elements, but also includes other elements that are not explicitly listed, or elements inherent to the process, method, article, or device. Unless otherwise defined, the use of "including a . . . " followed by an element does not exclude the existence of another same element in the process, method, article, or device.

The processes of the method or algorithm consistent with the embodiments disclosed herein can be directly implemented by a hardware, a software module executed by a processor, or a combination of the two. The software module can be stored in any storage medium including, for example, a random-access memory (RAM), an internal memory, a read-only memory (ROM), an electrically programmable ROM, an electrically erasable programmable ROM, a register, a hard disk, a mobile disk, or a CD-ROM.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the following claims.

What is claimed is:

1. A display control method comprising:
    performing plane detection, with a detection range, detecting a three-dimensional space environment on a physical environment within a front field of view (FOV) of an augmented reality (AR) device;
    determining a first object in the physical environment, the first object being a physical object for holding other objects;
    determining a display position of a second object based at least on the first object, the detection range, and a current FOV of the AR device, the first object being at a rest position, the second object being a virtual object, the display position of the second object including a display height and a display distance; and
    displaying the second object at the display position, wherein determining the display position of the second object includes,
    in response to the FOV of the AR device being moved and the second object not satisfying a relationship with a range of the FOV of the AR device, maintaining the display position of the second object unchanged;
    in response to the FOV of the AR device being moved in a moving direction and the second object satisfying the relationship with the range of the FOV of the AR device, controlling the display position of the second object to move in the moving direction; and
    in response to a distance between the second object and a boundary of the detection range of the plane detection being less than a predetermined distance and the FOV continuing to move in the moving direction, stopping controlling the display position of the second object.

2. The display control method of claim 1, wherein determining the display position of the second object based on the first object and the current FOV of the AR device includes:
    determining a first display position of the second object based on a range of the current FOV of the AR device and a size of the second object; and
    adjusting the first display position to a second display position based on the first display position and the first object to cause the second object to satisfy a relationship with the first object when being at the second display position, the first display position and the second display position being same or different.

3. The display control method of claim 2, wherein:
    the relationship is that there is no occlusion relationship between the first object and the second object; and
    adjusting the first display position to the second display position based on the first display position and the first object includes:
        determining whether there is an occlusion relationship between the second object and the first object when the second object is at the first display position, the occlusion relationship including:
            that one of the first object and the second object occludes another one of the first object and the second object, or
            that an occlusion area between the first object and the second object is larger than a threshold; and
        in response to determining that there is the occlusion relationship between the second object and the first object, adjusting the first display position to the second display position to avoid occlusion between the second object at the second position and the first object.

4. The display control method of claim 1, wherein determining the display position of the second object based at least on the first object and the current FOV of the AR device includes:
    determining the display position of the second object based on the first object and a position and a posture of a user of the AR device, to cause a distance between the display position and a boundary of the current FOV of the AR device to be greater than or equal to a first distance, and cause a distance between the display position and the AR device to be less than or equal to a second distance.

5. The display control method of claim 1,
    wherein the second object includes a plurality of third objects;
    the method further comprising:
        obtaining an operation, the operation including placing a movement target, and the movement target being one of the plurality of third objects; and
        controlling to place the movement target at a position based on the operation, the position being located above and in contact with the first object.

6. The display control method of claim 5,
    wherein:
        a fixed relative positional relationship exists among the plurality of third objects; and
        the operation is a first operation and the position is a first position;
    the method further comprising, before controlling to place the movement target at the first position:
        obtaining a second operation, the second operation including grabbing the movement target; and controlling the movement target to release the relative positional relationship with other one or more of the third objects.

7. The display control method of claim 6, further comprising:
in response obtaining the second operation, locking the display position of the second object.

8. A display control device comprising:
a memory storing a computer program; and
a processor configured to execute the computer program to:
perform plane detection, with a detection range, detecting a three-dimensional space environment on a physical environment within a front field of view (FOV) of an augmented reality (AR) device;
determine a first object in the physical environment, the first object being a physical object for holding other objects;
determine a display position of a second object based at least on the first object the detection range, and a current FOV of the AR device, the first object being at a rest position, the second object being a virtual object, the display position including a display height and a display distance; and
display the second object at the display position, wherein to determine the display position of the second object includes,
in response to the FOV of the AR device being moved and the second object not satisfying a relationship with a range of the FOV of the AR device, maintain the display position of the second object unchanged;
in response to the FOV of the AR device being moved in a moving direction and the second object satisfying the relationship with the range of the FOV of the AR device, control the display position of the second object to move in the moving direction; and
in response to a distance between the second object and a boundary of the detection range of the plane detection being less than a predetermined distance and the FOV continuing to move in the moving direction, stop controlling the display position of the second object.

9. The display control device of claim 8, wherein the processor is further configured to execute the computer program to:
determine a first display position of the second object based on a range of the current FOV of the AR device and a size of the second object; and
adjust the first display position to a second display position based on the first display position and the first object to cause the second object to satisfy a relationship with the first object when being at the second display position, the first display position and the second display position being same or different.

10. The display control device of claim 9, wherein:
the relationship is that there is no occlusion relationship between the first object and the second object; and
the processor is further configured to execute the computer program to:
determine whether there is an occlusion relationship between the second object and the first object when the second object is at the first display position, and the occlusion relationship including:
that one of the first object and the second object occludes another one of the first object and the second object, or
that an occlusion area between the first object and the second object is larger than a threshold; and
in response to determining that there is the occlusion relationship between the second object and the first object, adjust the first display position to the second display position to avoid occlusion between the second object at the second position and the first object.

11. The display control device of claim 8, wherein the processor is further configured to execute the computer program to:
determine the display position of the second object based on the first object and a position and a posture of a user of the AR device, to cause a distance between the display position and a boundary of the current FOV of the AR device to be greater than or equal to a first distance, and cause a distance between the display position and the AR device to be less than or equal to a second distance.

12. The display control device of claim 8, wherein:
the second object includes a plurality of third objects;
the processor is further configured to execute the computer program to:
obtain an operation, the operation including placing a movement target, and the movement target being one of the plurality of third objects; and
control to place the movement target at a position based on the operation, the position being located above and in contact with the first object.

13. The display control device of claim 12, wherein:
a fixed relative positional relationship exists among the plurality of third objects;
the operation is a first operation and the position is a first position; and
the processor is further configured to execute the computer program to, before controlling to place the movement target at the first position:
obtain a second operation, the second operation including grabbing the movement target; and
control the movement target to release the relative positional relationship with other one or more of the third objects.

14. The display control device of claim 13, wherein the processor is further configured to execute the computer program to:
in response obtaining the second operation, lock the display position of the second object.

* * * * *